United States Patent
Greenaway et al.

(10) Patent No.: US 6,229,993 B1
(45) Date of Patent: May 8, 2001

(54) MOBILE PHONE HAND SET

(75) Inventors: John Greenaway; Paul Spicer, both of Imperial Way Reading (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/987,011

(22) Filed: Dec. 9, 1997

(51) Int. Cl.$^7$ ....................................................... H04B 1/08
(52) U.S. Cl. ............................. 455/90; 455/351; 361/814
(58) Field of Search ............................. 455/575, 90, 347, 455/349, 351; 379/433, 434; 361/814, 747, 728, 752

(56) References Cited

U.S. PATENT DOCUMENTS

| | | | |
|---|---|---|---|
| 4,890,199 | 12/1989 | Beutler | 361/424 |
| 5,438,482 | * 8/1995 | Nakamura et al. | 361/816 |
| 5,557,507 | 9/1996 | Koike et al. | 361/816 |
| 5,831,371 | * 11/1998 | Thornton | 455/349 |

FOREIGN PATENT DOCUMENTS

| | | |
|---|---|---|
| 3311653 | 10/1984 | (DE) . |
| 2293517 | 3/1996 | (GB) . |
| 2314230 | 12/1997 | (GB) . |
| WO96 23395 | 8/1996 | (WO) . |
| WO97 32423 | 9/1997 | (WO) . |

* cited by examiner

*Primary Examiner*—Thanh Cong Le
(74) *Attorney, Agent, or Firm*—Sughrue, Mion, Zinn, Macpeak & Seas, PLLC

(57) ABSTRACT

A mobile phone handset having a housing that includes a front part and a back part, in which the front part and back part housings are joined in an overlapping manner. The mobile phone handset is capable of allowing significant variations on the physical appearance of the handset such as changing the shape of the front face. These variations involve no re-design of the back part and a core of the phone because the housing of the front part overlaps the housing of the back part when being connected.

8 Claims, 2 Drawing Sheets

MOBILE PHONE HAND SET

BACKGROUND OF THE INVENTION

This invention relates generally to a housing of a mobile phone handset. More particularly, this invention relates to a handset housing in which a front part of the housing overlaps a back part of the housing.

In common with many other types of small portable electrical apparatus, the outer housing of a mobile phone handset is conventionally formed from two "clam shell" shaped mouldings which are assembled together edge-to-edge. The visual design which can be applied to a handset constructed in this conventional manner is limited. If a manufacturer wishes to make a range of phone handsets of substantially differing visual appearance, it will generally be necessary to make both mouldings different for each design. This means that the manufacturer may need to make and stock many different outer housing mouldings.

Moreover, particularly where the two outer housing mouldings are of differently coloured materials or materials which are otherwise provided with a different visual appearance, the designer may wish to make the mating edge shapes non-linear and this will give rise to design complications.

SUMMARY OF THE INVENTION

It is an object of the present invention to provide a mobile phone handset in which these difficulties are overcome in a simple and efficacious manner.

In accordance with the invention there is provided a mobile phone handset having an-outer housing comprising a back part and a front part which has a skirt portion around its periphery shaped to receive and overlap the periphery of the back part.

With such a construction a common back part can be used for several differently designed phone handsets, with the visual appearance of the handset being determined by the shape of the front part. The shape of the free edge of the skirt portion of the front part, which has a very significant effect on the visual appearance of the handset does not need to match any corresponding edge on the back part.

BRIEF DESCRIPTION OF THE DRAWINGS

The above objectives and advantages of the present invention will become more apparent by describing in detail a preferred embodiment thereof with reference to the attached drawings in which.

DESCRIPTION OF A PREFERRED EMBODIMENT

Figure 1:
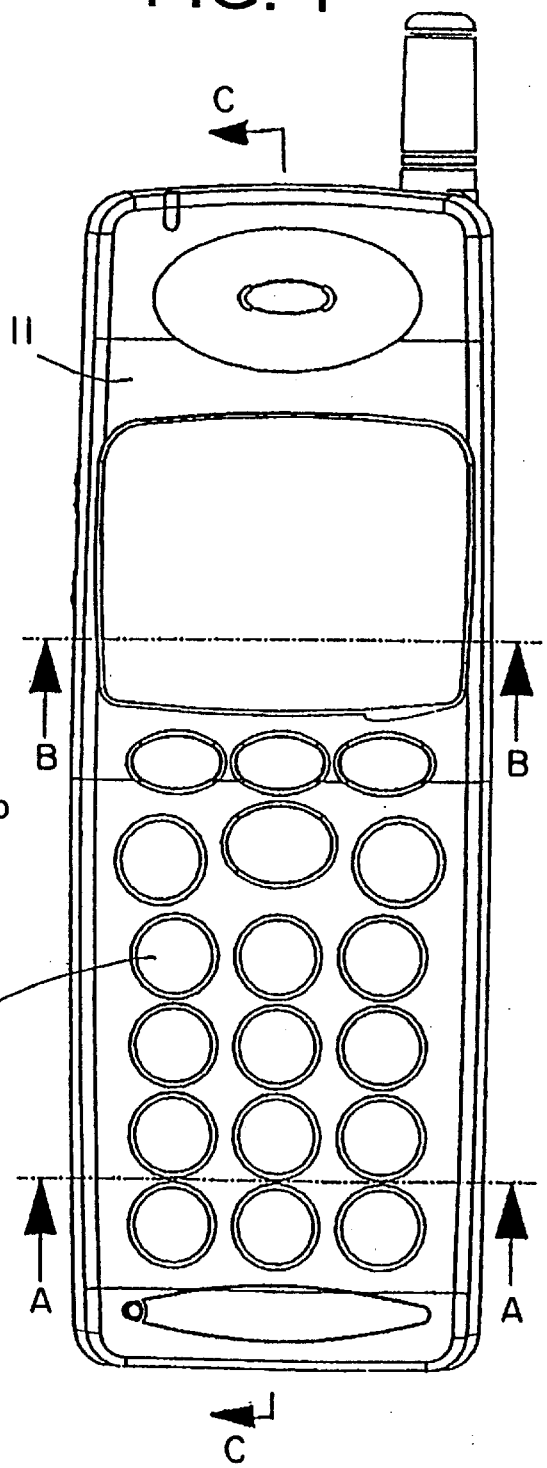
FIG. 1 is a front elevational view of a mobile phone handset according to an embodiment of the present invention.

Hereinafter, a preferred embodiment of the phone handset will be described in detail with reference to the attached drawings. However, the preferred embodiment is merely an example of the present invention, and thus, the specific features described below are merely used to more easily describe such embodiments and to provide an overall understanding of the present invention. Accordingly, one skilled in the art will readily recognize that the present invention is not limited to the specific embodiment described below. Furthermore, the description of various configurations of the present invention which would have been known to one skilled in the art are omitted for the sake of clarity and brevity.

The handset shown by way of example of the invention has an outer housing composed of two mouldings comprising a back part 10 and a front part 11. As can be seen from FIG. 2 to 5 the back part 10 supports the pcb 12 of the phone and a separate cover moulding 13 covers the pcb and is secured to the back part 10. These parts 10 and 13 form the basic core of the handset.

A separate display and keypad pcb 14 is located between the cover 13 and the front part 11. A keypad membrane 15 lies between a keypad 16 and the keyboard pcb 14, the keypad 16 having key portions which project through holes in the front part 11.

Figure 3:
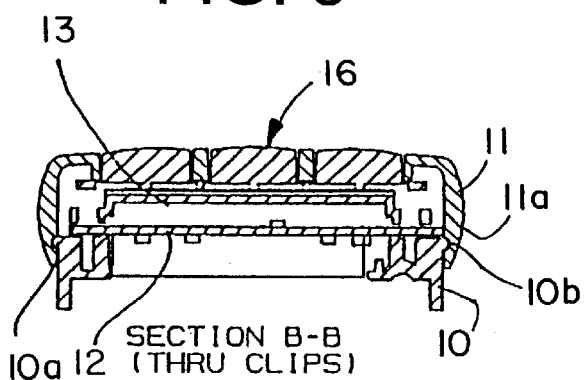
FIG. 3 is a sectional view taken along line B—B of FIG. 1.
Figure 2:
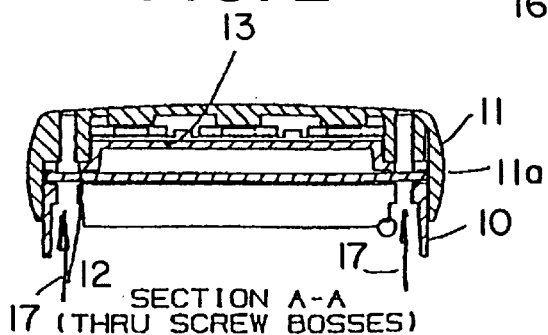
FIG. 2 is a sectional view taken along line A—A of FIG. 1.
Figure 4:
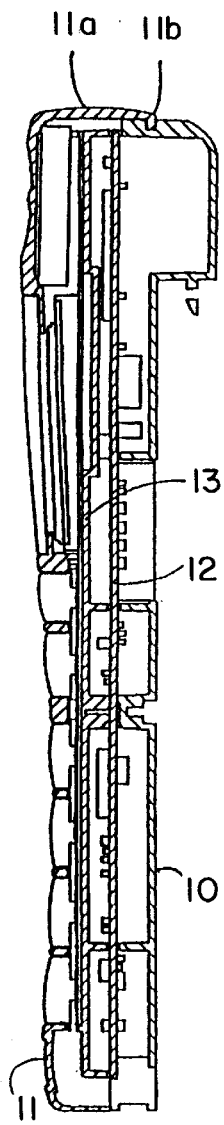
FIG. 4 is a sectional view taken along line C—C of FIG. 1.

The front part 11 has a skirt portion 11$^a$ around its periphery, which, as will be seen from FIGS. 2 to 4, receives the periphery of the back part The front part 11 is retained on the back part 10 by three integral clips and a pair of screws. One clip is formed by a tongue 11$b$ inside the skirt portion 11$a$ at one end of the front part 11. This is received by a corresponding undercut groove in the periphery of the back part 10 (see FIG. 4). The other two clips are formed by short ribs 10$^a$ and 10$^b$ on the peripheral sides of the back part 10. These are received by corresponding undercut grooves in the interior face of the skirt portion 11$^a$ (see FIG. 3). The screws (shown as arrows 17) are inserted through holes formed inside the back part 10 adjacent its opposite end and into blind receiving bores in bosses inside the skirt portion 11$^a$ of the front part 11 (see FIG. 2).

Figure 5:
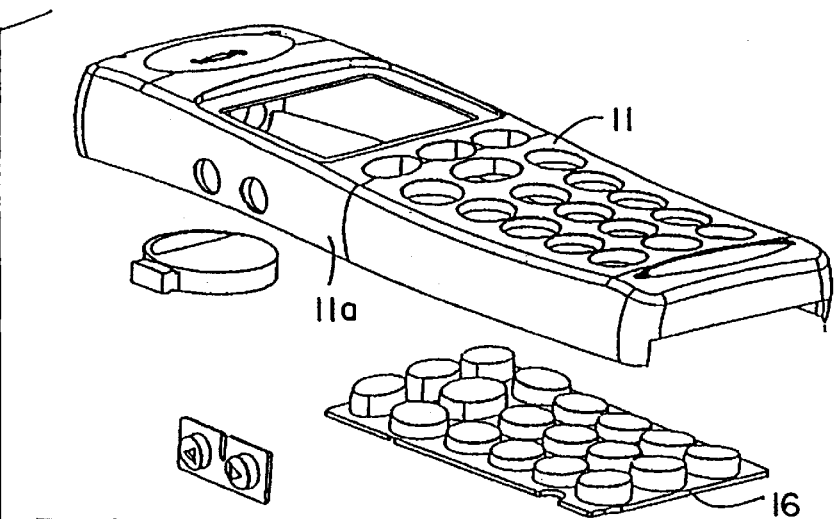
FIG. 5 is an exploded perspective view of the mobile phone handset of the embodiment FIG. 1.
Figure 5:
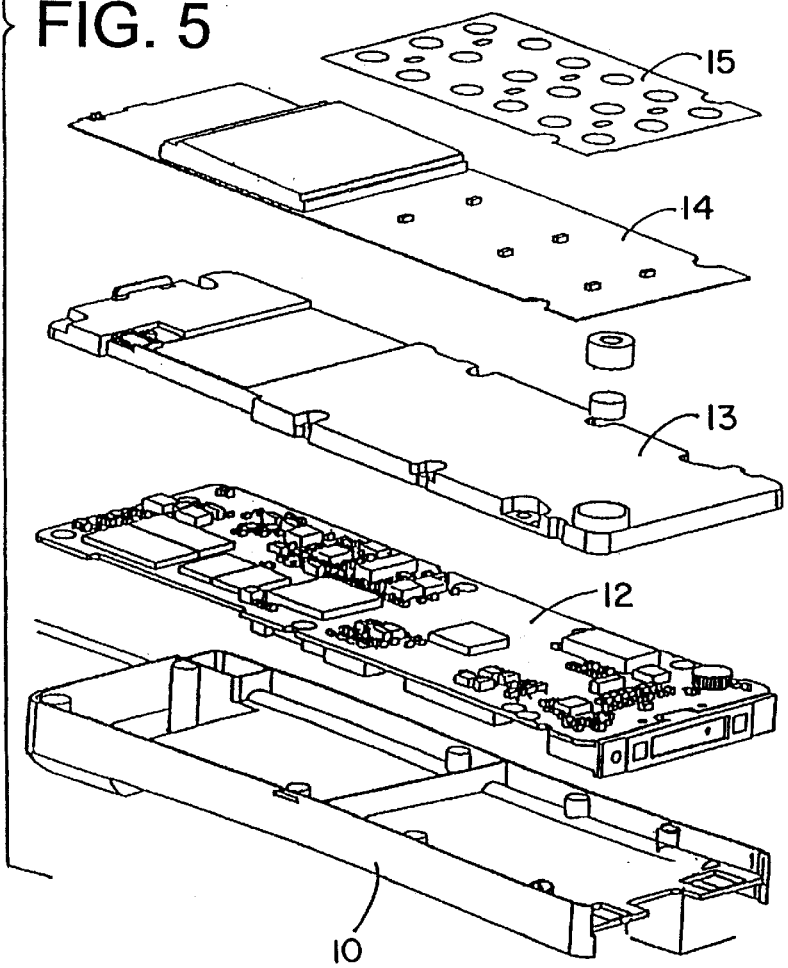

It will be noted from FIG. 5, that the shape of the front part 11 is such that its front face is non-planar and the free edge of the skirt portion 11$^a$ is non-linear. Significant variations in the visual appearance of the handset can be made by changing the shape of the front face and the free edge of the skirt. These variations involve no re-design of or retooling for the back part and the rest of the core of the phone as the skirt portion overlaps the back portion rather than fitting edge-to-edge as in the prior art.

It will be noted that the designer can also make changes to the visual appearance of the handset by varying the keypad design, since the keypad does not form a part of the core of the handset. The key shapes can be varied and the holes for the keys correspondingly changed.

Furthermore, the previous description of an embodiment is provided to enable a person skilled in the art to make or use the present invention. Moreover, various modifications to the above embodiment will be readily apparent to those skilled in the art, and the generic principles defined herein may be applied to other embodiments without the use of inventive faculty. Therefore, the present invention is not intended to be limited to the embodiment described herein but is to be accorded the widest scope as defined by the claims.

What is claimed is:

1. A mobile phone handset having an outer housing, said mobile handset comprising:

a back part of the outer housing;

a front part of the outer housing;

a skirt portion around a periphery of said front part; wherein said skirt portion is shaped to receive and overlap a peripheral edge of said back part; and said skirt portion contains a free edge that does not mate with any corresponding edge on said back part.

2. A mobile phone handset as claimed in claim 1, wherein said skirt has non-linear edges.

3. A mobile phone handset as claimed in claim 1 or claim 2, further comprising a phone pcb and a cover therefor attached to said back part and forming a core of the handset.

4. A mobile phone handset as claimed in claim 3, further comprising a display and keypad pcb located between said cover and an interior of the front part and a keypad having keys projecting into holes in the front part.

5. A mobile phone handset according to claim 1, wherein said skirt portion further comprises at least one tongue disposed at an inside surface of said skirt portion.

6. A mobile phone handset according to claim 5, wherein at least one groove disposed at said peripheral edge of said back part receives said at least one tongue of said skirt portion to retain said front part and said back part together.

7. A mobile phone handset according to claim 1, wherein said peripheral edge further comprises at least one rib at an outer surface of said peripheral edge.

8. A mobile phone handset according to claim 7, wherein said skirt portion further comprise at least one groove at an inside surface of said skirt portion to receive said at least one rib to retain said front part and said back part together.

\* \* \* \* \*